United States Patent [19]

Fields

[11] 3,891,656

[45] June 24, 1975

[54] ARYLATION PROCESS

[75] Inventor: Ellis K. Fields, River Forest, Ill.

[73] Assignee: Standard Oil Company, Chicago, Ill.

[22] Filed: July 6, 1970

[21] Appl. No.: 52,709

Related U.S. Application Data

[63] Continuation-in-part of Ser. No. 674,087, Oct. 10, 1967, abandoned, which is a continuation-in-part of Ser. No. 597,553, Nov. 29, 1966, abandoned.

[52] U.S. Cl. ...... 260/290 R; 260/283 R; 260/287 R; 260/288 R; 260/294.8 D; 260/296 R; 260/296 D; 260/304; 260/307 D; 260/332.5; 260/329 R; 260/346.2 M; 260/465 R; 260/465 K; 260/465 D; 260/475 R; 260/476 R; 260/469; 260/612 R; 260/619 R; 260/646; 260/648 R; 260/649 DP; 260/649 R; 260/670; 260/248 R; 260/250 R; 260/250 A; 260/251 R; 260/279 R; 260/668 R; 260/309.2; 260/313.1; 260/562 P; 260/576; 260/315; 260/578; 260/319.1; 260/335; 260/346.1; 260/326.1; 260/515 R; 260/546; 260/330.5

[51] Int. Cl. .... C07c 1/00; C07c 15/12; C07c 15/14; C07d 31/20

[58] Field of Search .......... 260/290, 465, 469, 475, 260/649, 329, 620, 670, 346.2, 476, 648, 646, 619, 668

[56] References Cited
UNITED STATES PATENTS 3,524,857   8/1970   Shavel ................................ 260/286
3,555,029   1/1971   Shavel ................................ 260/286

OTHER PUBLICATIONS

Maksimov, Chemical Abstracts, Vol. 59, Col. 15137(d), 1963.

Fields et al., J. Am. Chem. Soc., Vol. 89, pp. 724–725, (1967).

Fields et al., J. Am. Chem. Soc., Vol. 89, pp. 3224–3228, (1967).

Smith, Transactions, Faraday Soc., Vol. 36, pp. 983–987, (1940).

*Primary Examiner*—Harry I. Moatz
*Attorney, Agent, or Firm*—Gunar J. Blumberg; Arthur G. Gilkes; William T. McClain

[57] ABSTRACT

Aromatic compounds — either carbocyclic or heterocyclic — can be arylated by heating them with a nitro-substituted aromatic compound. Suitable reaction conditions include temperatures of about 400°–1000°C., pressures of about 0.01 to 1000 atmospheres, and a reaction time of 0.1 seconds to 10 hours. Also aromatic carbocyclic and aromatic heterocyclic compounds can be dimerized in the presence of nitro substituted aromatic compounds at similar reaction conditions.

12 Claims, No Drawings

ARYLATION PROCESS

This application is a continuation-in-part of co-pending Application Ser. No. 674,087 filed Oct. 10, 1967 which is, in turn, a continuation-in-part of Application Ser. No. 597,553 filed Nov. 29, 1966, both now abandoned This invention relates to the arylation of aromatic carbocyclic and heterocyclic compounds. Various processes for the arylation of aromatic compounds are known to the prior art. According to my process, improved results are obtained when aromatic carbocyclic and heterocyclic compounds containing nitro groups are reacted at elevated temperatures with other carbocyclic and heterocyclic compounds (hereinafter referred to as "target compounds" or "co-reactant").

The process of my invention proceeds according to the equation $R(NO_2)_n X_m + R'Y_pH \rightarrow RX_m - (R'Y_p)_q$ where R and R' are radicals of carbocyclic or heterocyclic compounds of aromatic character. X and Y are substituents such as alkyl, including methyl, ethyl, propyl, butyl, hexyl, decyl, octadecyl and iso-, secondary- and tertiary-alkyls such as isopropyl, t-butyl, secondary amyl and the like; halogenated alkyl such as trichloromethyl and trifluoromethyl; halo, such as fluoro, chloro, bromo, and iodo; hydroxy and alkoxy; amino and monoalkylamino and dialkylamino; mercapto and alkylthio; cyano, carboxy and ester groups; dicarboxylic acid anhydride groups; and acylamido groups; $m$, $p$, and $q$ are the same or different integers from 0 to 5; $n$ is an integer from 1 to 5. Preferably when X is an alkyl group such as methyl or ethyl, it should not be ortho to the nitro group.

The aromatic carbocyclic radicals are selected from benzene, fused carbocyclic compounds, and polyphenyl compounds.

Fused carbocyclic compounds having up to four rings are useful; preferred are those having 2 or 3 rings with up to 14 carbon ring-atoms. Such fused aromatic carbocyclic compounds include naphthalene, anthracene, phenanthrene, pyrene, chrysene, and rubrene.

Polyphenyl structures useful are those from bi-phenyl and terphenyl.

Heterocyclic compounds providing the nucleus for the nitro-compound or the co-reactant may be polycyclic or monocyclic. The hetero atoms are selected from oxygen, nitrogen and sulfur. The hetero rings of both the monocyclic and polycyclic types are 5- or 6-membered and are aromatic in character, i.e. — the hetero-rings are characterized as a closed, conjugated system, conjugated in the sense that $\pi$ — electrons can be found at alternate positions around the ring either as the $\pi$ — electrons of the multiple bonds or the unshared electron pairs of the hetero atom. This structural requirement for "aromaticity" is well known to chemists and has been elucidated by Fieser and Royals, among others.

The aromatic polycyclic heterocycles providing nuclei for the present invention are further characterized as being limited to 2-3 rings, each ring being fused to at least one other. While most of the useful polycyclic heterocycles consist of a single hetero-ring fused to 1-2 benzene nuclei, compounds — such as 1,8- napthyridine — having all their rings heterocyclic undergo the reaction. This is so, I have discovered, because aromaticity — regardless of the nature of the ring atoms — imparts the required stability. Exemplary of the useful polycyclic heterocycles are the nitrogen-containing quinoline, acridine, phenanthridine, benzopyrrole, dibenzopyrrole, benzimidazole, benzoxazole and napthyridine; the oxygen-containing benzofuran, dibenzofuran and xanthene; the sulfur-containing benzothiophene, dibenzothiophene and benzothiazole.

Useful aromatic monocyclic heterocycles include mono-hetero compounds as furan, thiophene, pyrrole, N-methyl pyrrole and pyridine and such all-nitrogen, aromatic polyazines as pyridazine, pyrazine, pyrimmidine and 1,3,5-triazine.

My process comprises heating aromatic carbocyclic and heterocyclic compounds containing nitro groups with a co-reactant compound in the mole ratio of 1:1 to 1:100 at temperatures of 400°–1000°C. and pressures of 0.01 to 1000 atmospheres for 0.1 second to 10 hours. To carry out the process effectively inert gases such as nitrogen, helium, argon, or carbon dioxide may be used to blanket or convey the reactants.

Under the preferred conditions the mole ratio of nitro-compound to the co-reactant is 1:2 to 1:10. The temperature is preferably maintained at about 450 to 700°C. and the pressure is maintained at about 0.5 to 2 atmospheres, the contact time being 3 to 30 seconds. The reaction can be conveniently carried out in a flow reactor such as through a tube and a filling of inert material, such as a quartz, or Vycor tube filled with quartz or Vycor beads.

Additionally, the process of my invention is useful in dimerizing the co-reactant molecules especially when the mole ratio of nitro-compound to co-reactant is 1:5 or lower; the broad range is suitably from about 1:1 to 1:50.

The wide variety of compounds produced by my process are useful in the preparation of pesticides, dyes, pharmaceuticals, plasticizers, lube oil additives, polyamides and polyesters. They are also useful as protective coatings on steel, zinc and aluminum, as ingredients in polyolefin shaped structures and as synthetic resins. Phenylpyridine of Example 5 is useful as a protective coating on steel, zinc and aluminum. This is disclosed in U.S. Pat. No. 2,766,154. Chlorobiphenyl of Example 6 is useful as an ingredient in the dyeing of polyolefin shaped structures. This is disclosed in British Pat. No. 862,233. Dicyanobiphenyl of Example 35 is useful as a dye intermediate as disclosed in German Pat. No. 955,178, and in photoconducting layers for electrophotographic reproduction as disclosed in German Pat. No. 1,060,259. Dibenzofuran of Example 10 is useful in dyes, as disclosed in Swiss Pat. No. 276,922 and German Pat. No. 899,535, and synthetic resins as disclosed in No. 829,062. Terphenyl of Examples 1, 2, 3, 40 and 41 is useful as scintillators. This is disclosed in U.S.S.R. Pat. No. 132,817; Japanese Pat. No. 5269, U.S. Pat. No. 2,719,284 and in lubricants, U.S. Pat. No. 2,979,457.

In the following examples the arylations were conducted in a Vycor tube containing Vycor beads heated in an electric furnace controlled electronically to ± 5°C. The analyses of the products were by gas chromatography, low voltage mass spectrometry, and by combined gas chromatography — mass spectrometry, where the effluent from the chromatography column is fed directly into a mass spectrometer. The products of each reaction are readily separated by conventional means such as distillation, crystallization, or chromatography.

The following examples are included as illustrations of my process and are not intended as limitations thereof:

EXAMPLE 1

A solution of 5.125 ml. (0.05 mole) nitrobenzene in 22.2 ml. (0.25 mole) benzene was passed through a Vycor tube filled with Vycor beads at 600°C. under pure, dry nitrogen flowing at 0.1 cubic foot per hour, with a contact time of 22 seconds. The excess benzene was distilled, leaving a residue of 8.8 g. which analyzed

| | |
|---|---|
| biphenyl | 62% |
| terphenyl | 13.9% |
| quaterphenyl | 2.8% |

EXAMPLE 2

To compare the products of benzene alone with those of Example 1, 22.2 ml. of benzene was treated under the identical conditions as in Example 1. The residue, after distilling the excess benzene, weighed 0.3 g. and consisted of 92 percent biphenyl and 8 percent terphenyl.

EXAMPLE 3

To determine the optimum temperature for the process of my invention, solutions of 5.125 ml. (0.05 mole) of nitrobenzene in 22.2 ml. (0.25 mole) of benzene were passed with nitrogen flowing at 0.1 cubic foot per hour through a Vycor tube filled with Vycor beads at various temperatures. In each case the condensate was distilled to a bottoms temperature of 200°C. and the residue analyzed by gas chromatography.

| Temperature, °C.: | 400 | 450 | 500 | 550 | 600 |
|---|---|---|---|---|---|
| Contact time, seconds | 16.8 | 14.2 | 13.4 | 12.3 | 9 |
| Weight of residue, g.: | 6.23 | 6.5 | 8.1 | 8.4 | 8.8 |
| Area %: Nitrobenzene | 88.6 | 74.0 | 28.9 | 5.86 | 0.17 |
| Biphenyl | 2.64 | 10.45 | 38.5 | 53.0 | 54.7 |
| Terphenyl | trace | 0.25 | 3.55 | 6.5 | 7.6 |

These data show that at 600° substantially all the nitrobenzene has reacted and the yield of arylation product, biphenyl, is the highest.

EXAMPLE 4

A solution of 10.25 ml. (0.1 mole) of nitrobenzene in 25.06 ml. (0.2 mole) of methyl benzoate was passed through a Vycor tube at 600°C. under nitrogen at 0.1 cubic foot per hour with a contact time of 18 seconds. The condensate was distilled to a pot temperature of 105°C. at 0.4 mm. to recover 16 ml. of methyl benzoate and give 8.2 g. of product that contained

| | |
|---|---|
| methyl diphenylcarboxylate | 23.4% |
| methyl terphenylcarboxylate | 6.2% |
| methyl quaterphenylcarboxylate | 1.5% |
| dimethyl diphenyl dicarboxylate | 2.4% |

EXAMPLE 5

A solution of 20.5 ml. (0.2 mole) of nitrobenzene in 32.3 ml. (0.4 mole) of pyridine was passed through a Vycor tube at 600°C. under nitrogen with a contact time of 17.8 seconds. The condensate was distilled to a bottoms temperature of 157°C. at 180 mm. to give a residue of 10.3 g. that consisted of these relative amounts of product:

| | |
|---|---|
| phenylpyridine | 50.1% |
| diphenyl pyridine | 11.4% |
| triphenyl pyridine | 4.7% |
| dipyridyl | 17.2% |

The isomer distribution of the phenyl pyridine fraction was

| | |
|---|---|
| 2-phenylpyridine | 64.2% |
| 3-phenylpyridine | 26.1% |
| 4-phenylpyridine | 9.7% |

EXAMPLE 6

A solution of 7.69 ml. (0.075 mole) of nitrobenzene in 30.24 ml. (0.3 mole) of chlorobenzene was passed through a Vycor tube at 600°C. under nitrogen with a contact time of 13.9 seconds. The condensate was distilled to a bottoms temperature of 175°C. at 180 mm. to give 11 g. residue that consisted of

| | |
|---|---|
| chlorobiphenyl | 33% |
| chloroterphenyl | 4.8% |
| dichlorobiphenyl | 31% |

EXAMPLE 7

A solution of 10.25 (0.1 mole) of nitrobenzene in 32.6 ml. (0.2 mole) of dimethyl phthalate was passed through a Vycor tube at 600°C. under nitrogen with a contact time of 19 seconds. The condensate was distilled to a bottoms temperature of 165°C. at 0.6 mm. to give 4.6 g. residue that consisted of

| | |
|---|---|
| dimethyl phenyl phthalate | 50.2% |
| dimethyl diphenyl phthalate | 5.1% |
| tetramethyl diphenyl tetra-carboxylate | 0.6% |

EXAMPLE 8

A solution of 2.05 ml. (0.02 mole) of nitrobenzene in 10.3 ml. (0.1 mole) of benzonitrile was passed through a Vycor tube at 600°C. under nitrogen with a contact time of 18.2 seconds. The condensate was distilled to a bottoms temperature of 95°C. at 0.7 mm. to recover 7 ml. of benzonitrile and obtain 3.7 g. of residue that consisted of these products:

| | |
|---|---|
| phenylbenzonitrile | 55% |
| diphenyl benzonitrile | 8.3% |
| dicyanodiphenyl | 23.2% |

EXAMPLE 9

A solution of 1.025 ml. (0.01 mole) of nitrobenzene in 7.86 ml. (0.1 mole) of thiophene was passed through a Vycor tube at 600°C. under nitrogen with a contact time of 12 seconds. The condensate was distilled to a bottoms temperature of 125°C. to recover 6 ml. of thiophene and obtain a residue of 1.3 g. that contained these products:

| phenylthiophene | 42% |
| diphenyl thiophene | 7.4% |
| dithienyl | 9.7% |

EXAMPLE 10

A solution of 10.25 ml. (0.01 mole) of nitrobenzene in 8.78 ml. (0.1 mole) of phenol was passed through a Vycor tube at 600°C. under nitrogen with a contact time of 23.5 seconds. The condensate was distilled to a bottoms temperature of 190°C. at 140 mm. to recover 6.6 ml. of phenol and obtain 1.55 g. of a residue that contained these products:

| phenyl phenol | 8.4% |
| dibenzofuran | 67% |
| phenyl dibenzofuran | 4.1% |
| dihydroxybiphenyl | 3.0% |

Under my arylation conditions o-phenylphenol readily loses hydrogen to give dibenzofuran, which accounts for the large proportion of this product.

EXAMPLE 11

A solution of 1.025 ml. (0.01 mole) of nitrobenzene in 10.93 ml. (0.1 mole) of anisole was passed through a Vycor tube at 600°C. under nitrogen with a contact time of 11.2 seconds. The condensate was distilled to a bottoms temperature of 165°C. at 140 mm. to recover 5 ml. of anisole and obtain 1.9 g. residue that consisted of

| phenyl anisole | 5% |
| diphenyl anisole | 0.5% |

EXAMPLE 12

A solution of 5.125 ml. (0.05 mole) of nitrobenzene in 26.6 ml. (0.25 mole) of toluene was passed through a Vycor tube at 600°C. under helium with a contact time of 15.5 seconds. The condensate was distilled to a bottoms temperature of 135°C. at 140 mm. to recover 22 ml. of toluene and obtain a residue of 6.1 g. that analyzed 65 percent phenyltoluene (methyl biphenyl).

EXAMPLE 13

A solution of 2.05 ml. (0.02 mole) of nitrobenzene in 11.2 ml. (0.1 mole) of iodobenzene was passed through a Vycor tube at 600°C. under nitrogen with a contact time of 19.3 seconds. The condensate was distilled to a bottoms temperature of 220°C. at 140 mm. to recover 10 ml. of iodobenzene and obtain 2.6 g. of residue that contained

| iodobiphenyl | 38% |
| iodoterphenyl | 3% |
| diiodobiphenyl | 10% |

EXAMPLE 14

A solution of 10.25 ml. (0.1 mole) of nitrobenzene in 60 ml. (0.5 mole) of o-xylene was passed through a Vycor tube at 600°C. under nitrogen with a contact time of 19 seconds. The condensate was distilled to a bottoms temperature of 133°C. at 140 mm. to recover 55 ml. of o-xylene and obtain 11 g. residue that analyzed

| phenyl o-xylene | 18.6% |
| methyl fluorene | 4.6% |
| diphenyl o-xylene | 0.4% |

Under these conditions some phenyl o-xylene is converted to methyl fluorene:

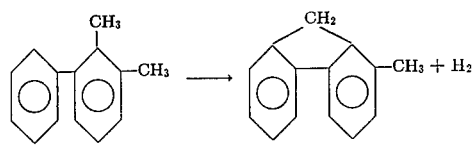

EXAMPLE 15

A solution of 1.91 g. (0.01 mole) 3-nitrobenzotrifluoride in 8.89 ml. benzene was passed through a Vycor tube at 600°C. under nitrogen with a contact time of 14.8 seconds. The condensate was distilled to a bottoms temperature of 150°C. to recover 6 ml. benzene and obtain 2.35 g. residue that analyzed

| trifluoromethyl biphenyl | 45.4% |
| di-trifluoromethyl terphenyl | 4.7% |

EXAMPLE 16

A solution of 1.91 g. (0.01 mole) 3-nitrobenzotrifluoride in 7.86 ml. (0.1 mole) thiophene was passed through a Vycor tube at 600°C. under nitrogen with a contact time of 16 seconds. The condensate was distilled to a bottoms temperature of 98°C. at 140 mm. to recover 5 ml. thiophene and obtain 1.15 g. residue that analyzed 85 percent trifluoromethylphenyl thiophene and 4 percent bis-(trifluoromethylphenyl)-thiophene.

EXAMPLE 17

A solution of 2.39 g. (0.01 mole) 5-nitro dimethyl isophthalate in 20.34 ml. (0.2 mole) chlorobenzene was passed through a Vycor tube at 600°C. under nitrogen with a contact time of 23.2 seconds. The condensate was distilled to a bottoms temperature of 155°C. at 140 mm. to recover 17 ml. chlorobenzene and obtain 3.65 g. residue that analyzed

| dimethyl chlorophenyl isophthalate | 3.5% |
| methyl chlorophenyl benzoate | 7.8% |

Evidently some loss of a

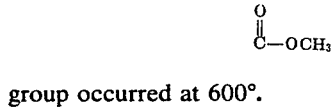

group occurred at 600°.

EXAMPLE 18

A solution of 1.73 g. (0.01 mole) 1-nitronaphthalene in 11.8 ml. (0.1 mole) quinoline was passed through a Vycor tube at 600°C. under nitrogen with a contact time of 29.8 seconds. The condensate was distilled to a bottoms temperature of 180°C. at 0.6 mm. to recover 9.5 ml. quinoline and obtain 1.3 g. residue that analyzed 74 percent naphthyl quinoline.

EXAMPLE 19

A solution of 1.68 g. (0.01 mole) m-dinitrobenzene in 10.3 ml. (0.1 mole) benzonitrile was passed through a Vycor tube at 600°C. under nitrogen with a contact time of 27.8 seconds. The condensate was distilled to a bottoms temperature of 185°C. at 140 mm. to recover 8 ml. benzonitrile and obtain 2.45 g. residue that contained these products:

| | |
|---|---|
| dicyano terphenyl | 11.7% |
| nitro cyano diphenyl | 3.6% |
| dicyanodiphenyl | 33% |

EXAMPLE 20

A solution of 1.68 g. (0.01 mole) m-dinitrobenzene in 10.2 ml. (0.1 mole) chlorobenzene was passed through a Vycor tube at 600°C. under nitrogen with a contact time of 20.6 seconds. The condensate was distilled to a bottoms temperature of 135°C. at 140 mm. to recover 7.5 ml. chlorobenzene and obtain 2.75 g. residue that analyzed

| | |
|---|---|
| dichloro terphenyl | 4.7% |
| chloronitro diphenyl | 18% |
| dichlorodiphenyl | 48% |

EXAMPLE 21

A solution of 1.68 g. (0.01 mole) m-dinitrobenzene in 7.86 ml. (0.1 mole) thiophene was passed through a Vycor tube at 600°C. under nitrogen with a contact time of 23.3 seconds. The condensate was distilled to a bottoms temperature of 125° to recover 5 ml. thiophene and obtain 1.15 residue that analyzed

| | |
|---|---|
| dithienylbenzene | 27% |
| nitrophenyl thiophene | 5.4% |
| dithienyl | 25% |

EXAMPLE 22

A solution of 1.68 g. (0.01 mole) m-dinitrobenzene in 8.06 ml. (0.1 mole) pyridine was passed through a Vycor tube at 600°C. with a contact time of 18.7 seconds. The condensate was distilled to a bottoms temperature of 125°C. at 140 mm. to recover 16 ml. pyridine and obtain 2.3 g. residue that analyzed

| | |
|---|---|
| dipyridyl benzene | 17.6% |
| nitrophenyl pyridine | 1.4% |
| dipyridyl | 33% |

EXAMPLE 23

A solution of 0.84 g. (0.005 mole) m-dinitrobenzene in 9.29 ml. (0.1 mole) fluorobenzene was passed through a Vycor tube at 600°C. under nitrogen with a contact time of 26.3 seconds. The condensate was distilled to a bottoms temperature of 115°C. to recover 4 ml. fluorobenzene and obtain a residue of 1.1 g. that analyzed

| | |
|---|---|
| difluoro terphenyl | 8% |
| fluoronitrodiphenyl | 4% |
| difluorodiphenyl | 39% |

EXAMPLE 24

A solution of 1.68 g. (0.01 mole) m-dinitrobenzene in 25.06 ml. (0.2 mole) methyl benzoate was passed through a Vycor tube at 600°C. under nitrogen with a contact time of 24.9 seconds. The condensate was distilled to a bottoms temperature of 130°C. at 3.7 mm. to recover 21 ml. methyl benzoate and obtain 2 g. residue that analyzed

| | |
|---|---|
| dimethyl terphenyl dicarboxylate | 4.8% |
| methyl nitrophenyl benzoate | 13% |
| dimethyl diphenyldicarboxylate | 21% |

EXAMPLE 25

A solution of 2.39 g. (0.01 mole) 5-nitro dimethyl isophthalate in 16.3 ml. (0.1 mole) dimethyl phthalate was passed through a Vycor tube at 600°C. under nitrogen with a contact time of 28 seconds. The condensate was distilled to a bottoms temperature of 130°C. at 0.25 mm. to recover 14 ml. dimethyl phthalate and obtain 1.35 g. residue that analyzed

| | |
|---|---|
| tetramethyl biphenyl tetracarboxylate | 26% |
| trimethyl biphenyl tricarboxylate | 33.3% |

EXAMPLE 26

A solution of 4.53 g. (0.05 mole) methyl p-nitrobenzoate in 88.8 ml. (1 mole) benzene (this large quantity of benzene was needed to dissolve the nitro ester) was passed through a Vycor tube at 600°C. under nitrogen with a contact time of 8.7 seconds. The condensate was distilled to a bottoms temperature of 180°C. at 0.26 mm. to recover 80 ml. benzene and obtain 1.4 g. residue that analyzed 92 percent methyl biphenyl carboxylate.

EXAMPLE 27

A solution of 2.39 g. (0.01 mole) 5-nitro dimethyl isophthalate in 11.8 ml. (0.1 mole) quinoline was passed through a Vycor tube at 600°C. under nitrogen with a contact time of 26.7 seconds. The condensate was distilled to a bottoms temperature of 100°C. at 0.6 mm. to recover 9 ml. quinoline and obtain 1.2 g. residue that analyzed

| | |
|---|---|
| quinolyl dimethyl isophthalate | 14.3% |
| quinolyl methyl benzoate | 6.4% |

EXAMPLE 28

A solution of 2.39 g. (0.01 mole) 5-nitro dimethyl isophthalate in 20.6 ml. (0.1 mole) benzonitrile was passed through a Vycor tube at 600°C. under nitrogen with a contact time of 21.4 seconds. The condensate was distilled to a bottoms temperature of 210°C. at 140 mm. to recover 17 ml. benzonitrile and obtain 3.7 g. residue that analyzed

| | |
|---|---|
| cyanophenyl dimethyl isophthalate | 13% |
| cyanophenyl methyl benzoate | 5% |

EXAMPLE 29

A solution of 2.39 g. (0.01 mole) 5-nitro dimethyl isophthalate in 16.12 ml. (0.2 mole) pyridine was passed through a Vycor tube at 600°C. with a contact time of 15.1 seconds. The condensate was distilled to a bottoms temperature of 180°C. at 140 mm. to recover 14 ml. pyridine and obtain 2.9 g. residue that analyzed

| | |
|---|---|
| pyridyl dimethyl isophthalate | 14.5% |
| pyridyl methyl benzoate | 6% |

EXAMPLE 30

A solution of 1.73 g. (0.01 mole) 1-nitronaphthalene in 10.93 ml. (0.1 mole) anisole was passed through a Vycor tube at 600°C. under nitrogen with a contact time of 27.6 seconds. The condensate was distilled to a bottoms temperature of 220°C. at 140 mm. to recover 9 ml. anisole and obtain 1.8 g. residue that analyzed

| | |
|---|---|
| naphthyl anisole | 7.8% |
| naphthyl phenol | 7.8% |

At 600° evidently some of the naphthyl anisole is demethylated to naphthyl phenol.

EXAMPLE 31

A solution of 1.37 g. (0.01 mole) p-nitrotoluene in 8.89 ml. (0.1 mole) benzene was passed through a Vycor tube at 600°C. under nitrogen with a contact time of 21.9 seconds. The condensate was distilled to a bottoms temperature of 145°C. to recover 6 ml. benzene and obtain 1.6 g. residue that analyzed

| | |
|---|---|
| tolyl benzene (methyl biphenyl) | 33.5% |
| ditolyl benzene | 1% |
| biphenyl | 48% |

EXAMPLE 32

A solution of 1.37 g. (0.01 mole) p-nitrotoluene in 10.17 ml. (0.1 mole) chlorobenzene was passed through a Vycor tube at 600°C. under nitrogen with a contact time of 22.4 seconds. The condensate was distilled to a bottoms temperature of 150°C. at 140 mm. to recover 8 ml. chlorobenzene and obtain 1.1 g. residue that analyzed 58 percent tolyl chlorobenzene.

EXAMPLE 33

A solution of 2.13 g. (0.01 mole) 1,3,5-trinitrobenzene in 26.4 ml. (0.3 mole) benzene was passed through a Vycor tube at 600°C. under nitrogen with a contact time of 15.3 seconds. The condensate was distilled to a bottoms temperature of 135°C. to recover 20.5 ml. benzene and obtain 1.9 g. residue that analyzed

| | |
|---|---|
| triphenyl benzene | 7.8% |
| diphenyl nitrobenzene | 4.8% |
| phenyl dinitrobenzene | 1.2% |
| biphenyl | 41% |

EXAMPLE 34

A solution of 1.48 g. (0.01 mole) m-nitrobenzonitrile in 9.29 ml. (0.1 mole) fluorobenzene was passed through a Vycor tube at 600°C. under nitrogen with a contact time of 23.8 seconds. The condensate was distilled to a bottoms temperature of 110°C. to recover 4 ml. fluorobenzene and obtain 2.0 g. residue that analyzed

| | |
|---|---|
| fluorophenyl benzonitrile | 22.2% |
| di-(cyanophenyl) fluorobenzene | 0.5% |

EXAMPLE 35

A solution of 1.63 g. (0.01 mole) m-nitrobenzonitrile in 10.3 ml. (0.1 mole) benzonitrile was passed through a Vycor tube at 600°C. under nitrogen with a contact time of 30 seconds. The condensate was distilled to a bottoms temperature of 180°C. at 200 mm. to recover 7.5 ml. benzonitrile and obtain 4.5 g. residue that analyzed

| | |
|---|---|
| dicyanodiphenyl | 54% |

EXAMPLE 36

A solution of 1.63 g. (0.01 mole) 6-nitrobenzimidazole in 11.8 ml. (0.1 mole) quinoline was passed through a Vycor tube at 600°C. with a contact time of 29.7 seconds. The condensate was distilled to a bottoms temperature of 69°C. at 0.05 mm. to recover 10 ml. quinoline and obtain 1.9 residue that analyzed 40 percent benzimidazolyl quinoline.

EXAMPLE 37

A mixture of 2.05 ml. (0.02 mole) nitrobenzene and 18.6 g. (0.1 mole) hexafluorobenzene was passed through a Vycor tube at 600°C. under nitrogen flowing at 0.1 cubic foot per hour with a contact time of 34.1 seconds. The condensate was distilled to a bottoms temperature of 120°C. to recover 12.4 g. of hexafluorobenzene and obtain a residue of 6.6 g. that analyzed

| | |
|---|---|
| hexafluorobiphenyl | 31% |
| pentafluorobiphenyl | 33% |
| decafluorobiphenyl | 17% |

EXAMPLE 38

A mixture of 1.53 g. (0.01 mole) 4-nitro-o-phenylene diamine and 16.16 ml. (0.2 mole) pyridine was passed through a Vycor tube at 600°C. under nitrogen at 0.1 cubic foot per hour with a contact time of 32.3 seconds. The condensate was distilled to a bottoms temperature of 90°C. at 200 mm. to recover 12 ml. pyridine and obtain a residue of 0.65 g. of which 0.279 g. was 4-pyridyl - o-phenylene diamine.

EXAMPLE 39

A mixture of 1.91 g. (0.01 mole) 3-nitrobenzotrifluoride and 9.3 g. (0.05 mole) hexafluorobenzene was passed through a Vycor tube at 600°C. under nitrogen at 0.1 cubic foot per hour with a contact time of 35 seconds. The condensate was distilled to a bottoms temperature of 110°C. to recover 3.1 g. hexafluorobenzene and obtain a residue of 1.2 g. that analyzed

| | |
|---|---|
| 3-pentafluorophenyl benzotrifluoride | 33.3% |
| di-(trifluoromethylphenyl)-tetrafluorobenzene | 3.3% |

EXAMPLE 40

A mixture of 9.96 g. (0.05 mole) 4-nitrobiphenyl in 22.2 ml. (0.25 mole) benzene was passed through a Vycor tube at 600°C. under nitrogen at 0.1 cubic foot per hour with a contact time of 20.1 seconds. The condensate was distilled to a bottoms temperature of 135°C. to recover 9 ml. benzene and obtain a residue of 5.65 g. that contained 21.4 percent p-terphenyl.

EXAMPLE 41

A mixture of 30.8 g. (0.2 mole) biphenyl and 10.27 ml. (0.1 mole) nitrobenzene was passed through a Vycor tube at 600°C. under nitrogen at 0.1 cubic foot per hour with a contact time of 21.5 seconds. The condensate was distilled to a bottoms temperature of 285°C. to recover 15.6 biphenyl and obtain a residue of 18.04 g. that analyzed

| | |
|---|---|
| o-terphenyl | 2.4% |
| m-terphenyl | 13.4% |
| p-terphenyl | 8.5% |

EXAMPLE 42

A mixture of 38.2 g. (0.2 mole) of m-nitrobenzotrifluoride and 67.6 g. (0.5 mole) of benzothiazole was passed through a Vycor tube at 600°C. under nitrogen at 0.1 cubic foot per hour with a contact time of 27 seconds. The condensate was distilled to recover 46 g. of benzothiazole and obtain 42 g. of a fraction boiling at 140°–260°C. at 0.7 mm. that analyzed 42 percent trifluoromethylphenyl benzothiazole.

EXAMPLE 43

A mixture of 38.2 g. (0.2 mole) of m-nitrobenzotrifluoride and 59.57 g. (0.5 mole) of benzoxazole was passed through a Vycor tube at 600°C. under nitrogen at 0.1 cubic foot/minute with a contact time of 31.5 seconds. The condensate was distilled to recover 15.1 g. of benzoxazole and obtain 46.5 g. of product that analyzed 35 percent trifluoromethylphenyl benzoxazole.

EXAMPLE 44

To demonstrate the coupling of two unlike compounds by nitrobenzene, a mixture of 5.125 ml. (0.05 mole) of nitrobenzene, 20.15 ml. (0.25 mole) of pyridine, and 19.65 ml. (0.25 mole) of thiophene was passed through a Vycor tube at 600°C. under nitrogen at 0.1 cubic foot/minute with a contact time of 13.9 seconds. The condensate was distilled to recover 32 ml. of a mixture of pyridine and thiophene and obtain 6.8 g. of product that analyzed

| | |
|---|---|
| phenylpyridine | 20% |
| phenylthiophene | 50% |
| pyridylthiophene | 24% |

EXAMPLE 45

In a similar preparation, a mixture of 5.125 ml. (0.05 mole) of nitrobenzene, 28.2 ml. (0.25 mole) of o-dichlorobenzene, and 19.65 ml. (0.25 mole) of thiophene was passed through a Vycor tube at 600°C. under nitrogen at 0.1 cubic foot/minute with a contact time of 16.8 seconds. The condensate was distilled to recover 42 ml. of thiophene and o-dichlorobenzene and give 5 g. of product that analyzed 16 percent phenylthiophene, 7 percent dichlorobiphenyl, and 10 percent dichlorophenyl thiophene.

EXAMPLE 46

A mixture of 19.2 g. (0.1 mole) of 3,4-dichloronitrobenzene and 78.6 ml. (1 mole) of thiophene was passed through a Vycor tube at 600°C. under nitrogen at 0.1 cubic foot/minute with a contact time of 17.4 seconds. The condensate was distilled to recover 62 ml. of thiophene and obtain 18.9 g. of product that analyzed 43 percent of 3,4-dichlorophenylthiophene and 28.3 percent of dithienyl.

EXAMPLE 47

To demonstrate the utility of the process of my invention in dimerizing aromatic and heterocyclic compounds, mixtures of 5.125 ml. (0.05 mole) of nitrobenzene and pyridine in various mole ratios were passed through a Vycor tube at 600°C. under nitrogen at 0.1 cubic foot/minute and a contact time of 15 seconds. The condensates were distilled to recover pyridine and the products were weighed and analyzed for phenylpyridine and dipyridyl, with these results:

| Mole Ratio, Nitrobenzene: Pyridine | Wt. of Product, g. | Yield, Mole % | |
|---|---|---|---|
| | | Phenylpyridine | Dipyridyl |
| 1:1 | 3.65 | 10.6 | 1.8 |
| 1:2 | 4.5 | 19.4 | 6.0 |
| 1:5 | 8.0 | 41.6 | 25.6 |
| 1:10 | 9.6 | 49 | 44.7 |
| 1:20 | 12.35 | 44.4 | 53.6 |

For comparison, the same amounts of pyridine without nitrobenzene at 600°C. under nitrogen with contact time of 15 seconds gave 0.002 g., 0.007 g., 0.013 g., 0.042 g., and 0.087 g. of product, respectively. It is clearly evident from these results that nitrobenzene at lower mole ratios is effective in coupling two pyridine molecules together in relatively high yields; further, that the total yield of the two products increases as the mole ratio of nitrobenzene to reactant decreases.

EXAMPLE 48

Similarly, mixtures of 5.125 ml. (0.05 mole) of nitrobenzene with various mole ratios of thiophene were passed through a Vycor tube at 600°C. under nitrogen at 0.1 cubic foot per minute with a contact time of 12 seconds. The condensates were distilled to recover thiophene and the products were weighed and analyzed for phenylthiophene and dithienyl, with these results:

| Mole Ratio, Nitrobenzene: thiophene | Wt. of Product, g. | Yield, Mole % | |
|---|---|---|---|
| | | Phenylthiophene | Dithienyl |
| 1:1 | 3.6 | 38 | 6.4 |
| 1:5 | 3.9 | 40 | 8.2 |
| 1:10 | 5.65 | 42 | 9.7 |
| 1:20 | 6.9 | 45 | 18.7 |

EXAMPLE 49

Similarly, mixtures of 5.125 ml. (0.05 mole) of nitrobenzene with different mole ratios of chlorobenzene were passed through a Vycor tube at 600°C. under nitrogen at 0.1 cubic foot per minute with a contact time of 13.9 seconds. The condensate was distilled to recover chlorobenzene and the products were weighed and analyzed for chlorobiphenyl (the phenylation product) and dichlorobiphenyl (the chlorobenzene dimer), with these results:

| Mole Ratio, Nitrobenzene: Chlorobenzene | Wt. of Product, g. | Yield, Mole % | |
|---|---|---|---|
| | | Chlorobiphenyl | Dichlorobiphenyl |
| 1:2 | 5.33 | 28 | 18 |
| 1:4 | 7.34 | 31 | 33 |
| 1:10 | 10.2 | 31 | 66 |

Having described my invention, I claim:

1. An arylation process comprising:
   a. charging to a reaction zone a feed mixture of nitrobenzene, and an aromatic cylic co-reactant selected from the group consisting of methyl benzoate, pyridine, dimethyl phthalate, benzonitrile, thiophene, phenol, toluene, o-xylene, and chlorobenzene, in the mole ratio of about 1:1 to about 1:100 respectively;
   b. heating in the presence of an inert gas, the feed mixture to a temperature of about 400° to about 1,000°C for a time sufficient for reaction to occur; and
   c. maintaining during the heating period a pressure in the reaction zone of about 0.01 to 1,000 atmospheres.

2. The process of claim 1 wherein the reactants are nitrobenzene and pyridine.
3. The process of claim 1 wherein the reactants are nitrobenzene and dimethyl phthalate.
4. The process of claim 1 wherein the reactants are nitrobenzene and benzonitrile.
5. The process of claim 1 wherein the reactants are nitrobenzene and thiophene.
6. The process of claim 1 wherein the reactants are nitrobenzene and phenol.
7. The process of claim 1 wherein the reactants are nitrobenzene and toluene.
8. The process of claim 8 wherein the reactants are nitrobenzene and o-xylene.
9. An arylation process comprising:
   a. charging to a reaction zone a feed mixture of m-dinitrobenzene, and an aromatic cyclic co-reactant selected from the group consisting of benzonitrile and chlorobenzene, in the mole ratio of about 1:1 to about 1:100 respectively.
   b. heating in the presence of an inert gas, the feed mixture to a temperature of about 400° to about 1,000°C for a time sufficient for reaction to occur; and
   c. maintaining during the heating period a pressure in the reaction zone of about 0.01 to 1,000 atmospheres.
10. An arylation process comprising:
    a. charging to a reaction zone a feed mixture of p-nitrotoluene, and benzene, in the mole ratio of about 1:1 to about 1:100 respectively;
    b. heating in the presence of an inert gas, the feed mixture to a temperature of about 400° to about 1,000°C for a time sufficient for reaction to occur; and
    c. maintaining during the heating period a pressure in the reaction zone of about 0.01 to 1,000 atmospheres.
11. The process of claim 1 wherein the nitrocompound is nitrobenzene and the co-reactant is chlorobenzene.
12. The process of claim 9 wherein the nitrocompound is m-dinitrobenzene and the co-reactant is benzonitrile.

* * * * *

UNITED STATES PATENT OFFICE
CERTIFICATE OF CORRECTION

PATENT NO. : 3,891,656
DATED : June 24, 1975
INVENTOR(S) : Ellis K. Fields

It is certified that error appears in the above-identified patent and that said Letters Patent are hereby corrected as shown below:

Col. 14, line 13, for "claim 8" read -- claim 1 --

Signed and Sealed this twenty-third Day of September 1975

[SEAL]

Attest:

RUTH C. MASON
Attesting Officer

C. MARSHALL DANN
Commissioner of Patents and Trademarks